(12) United States Patent
Amir et al.

(10) Patent No.: US 11,610,499 B2
(45) Date of Patent: Mar. 21, 2023

(54) PRINTED CIRCUITRY

(71) Applicant: HEWLETT-PACKARD DEVELOPMENT COMPANY, L.P., Spring, TX (US)

(72) Inventors: Gideon Amir, Ness Ziona (IL); Niv Shem Tov, Ness Ziona (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/605,514

(22) PCT Filed: Mar. 26, 2018

(86) PCT No.: PCT/US2018/024287
§ 371 (c)(1),
(2) Date: Oct. 16, 2019

(87) PCT Pub. No.: WO2019/190451
PCT Pub. Date: Oct. 3, 2019

(65) Prior Publication Data
US 2021/0287562 A1 Sep. 16, 2021

(51) Int. Cl.
*G09B 5/06* (2006.01)

(52) U.S. Cl.
CPC .................... *G09B 5/062* (2013.01)

(58) Field of Classification Search
CPC . G09B 5/04; G09B 5/06; G09B 5/062; G09B 17/006
See application file for complete search history.

(56) References Cited

U.S. PATENT DOCUMENTS

| 2,997,793 | A | 8/1961 | Kelly |
| 3,579,857 | A | 5/1971 | Lamberson |
| 3,795,989 | A | 3/1974 | Greenberg et al. |
| 3,947,978 | A | 4/1976 | Clark et al. |
| 4,607,147 | A * | 8/1986 | Ono ...................... H01H 13/702 200/292 |
| 4,818,827 | A * | 4/1989 | Ipcinski ................. G09B 5/062 178/18.01 |
| 5,088,928 | A | 2/1992 | Chan |
| 5,597,183 | A * | 1/1997 | Johnson ................. B42D 3/123 281/38 |
| 5,810,604 | A | 9/1998 | Kopp et al. |
| 6,205,690 | B1 | 3/2001 | Heropoulos et al. |
| 6,476,773 | B2 | 11/2002 | Palmer et al. |
| 6,608,618 | B2 | 8/2003 | Wood et al. |
| 10,755,596 | B1* | 8/2020 | Rudie ....................... B42D 3/12 |
| 2010/0066071 | A1 | 3/2010 | Kelaidis |
| 2012/0187952 | A1* | 7/2012 | Coombs ................. G09B 5/062 324/519 |

FOREIGN PATENT DOCUMENTS

| CN | 101751800 A | 6/2010 |
| CN | 202472981 U | 10/2012 |
| CN | 202650282 U | 1/2013 |
| WO | 94/12963 A1 | 6/1994 |

* cited by examiner

*Primary Examiner* — Ryan W Sherwin

(57) ABSTRACT

In an example, printed circuitry comprises a digitally printed switch, the printed switch comprising a first contact element printed using conductive print agent on a first substrate portion and a second contact element printed using conductive print agent on a second substrate portion. An interposed non-conductive printed spacer element is overprinted on at least one of the first and the second substrate portions.

19 Claims, 11 Drawing Sheets

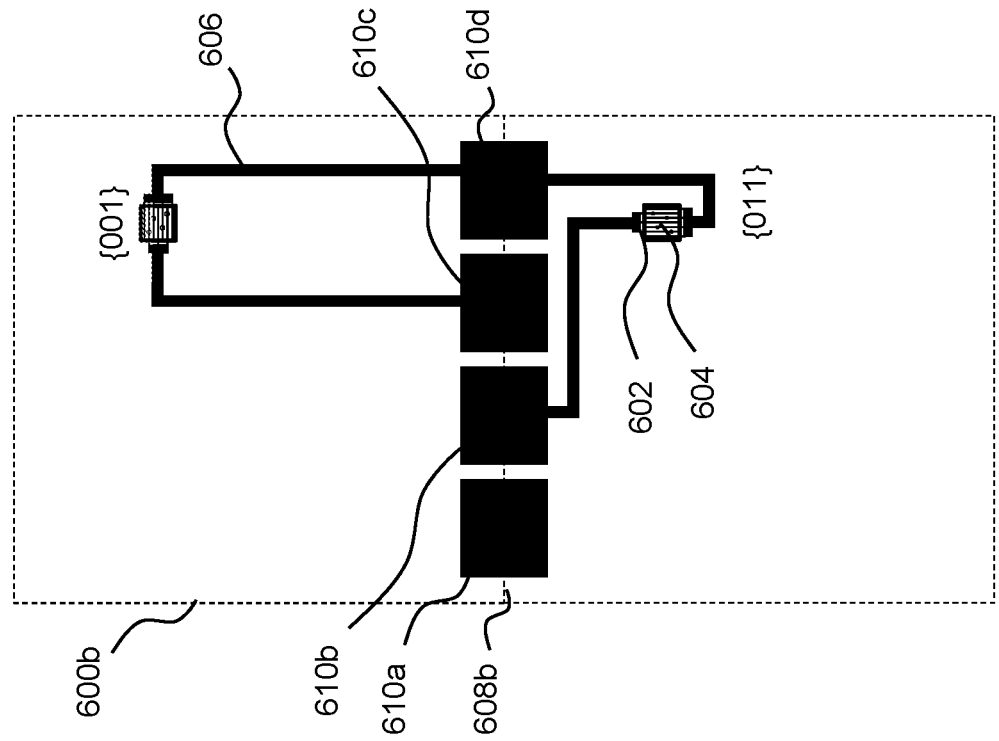
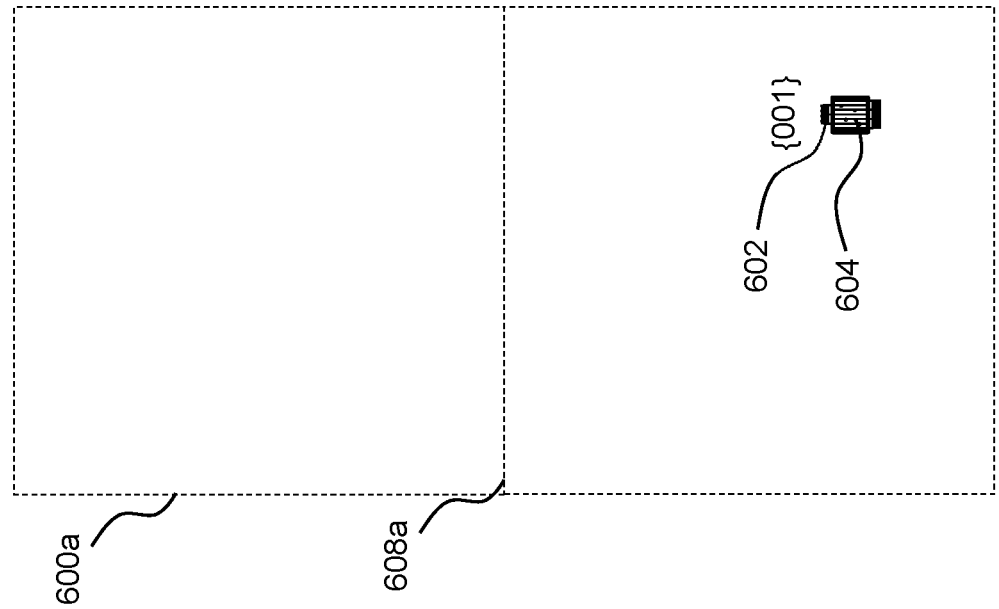
Fig. 6B
Fig. 6A

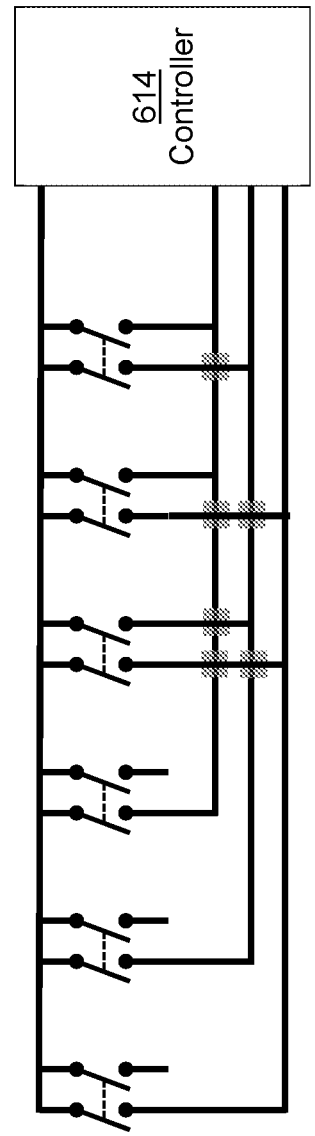
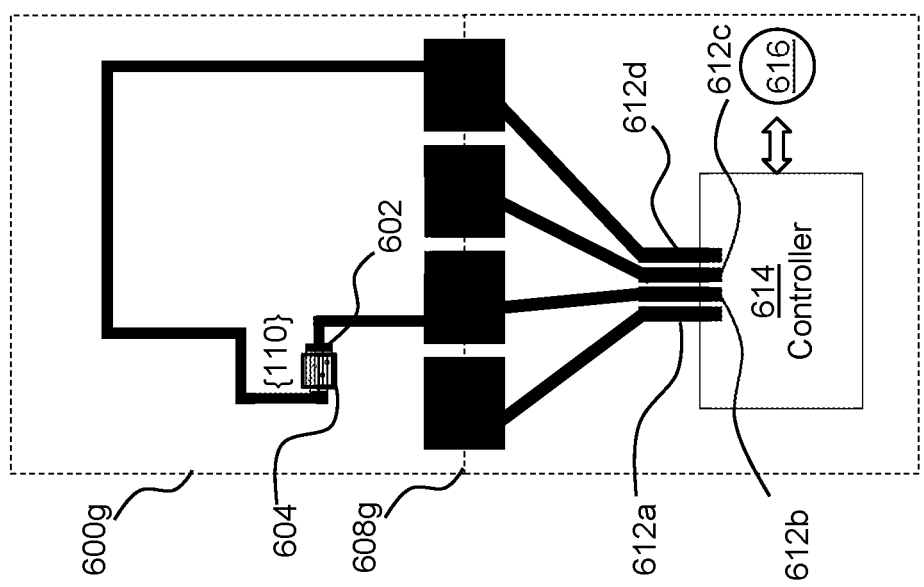
Fig. 6G
Fig. 7

PRINTED CIRCUITRY

BACKGROUND

Interactive media such as interactive books, posters, leaflets and the like may add interest to such media and/or provide learning toys or the like. For example, interactive books may be provided with speakers, lights and/or digital displays to assist in teaching children to recognise words or sounds.

BRIEF DESCRIPTION OF DRAWINGS

Non-limiting examples will now be described with reference to the accompanying drawings, in which:

FIGS. 6A-G show printed sheets for use in forming another electronic media item;

FIG. 7 is a circuit representing the circuit formed by the sheets of FIG. 6A-G;

DETAILED DESCRIPTION

Figure 1:
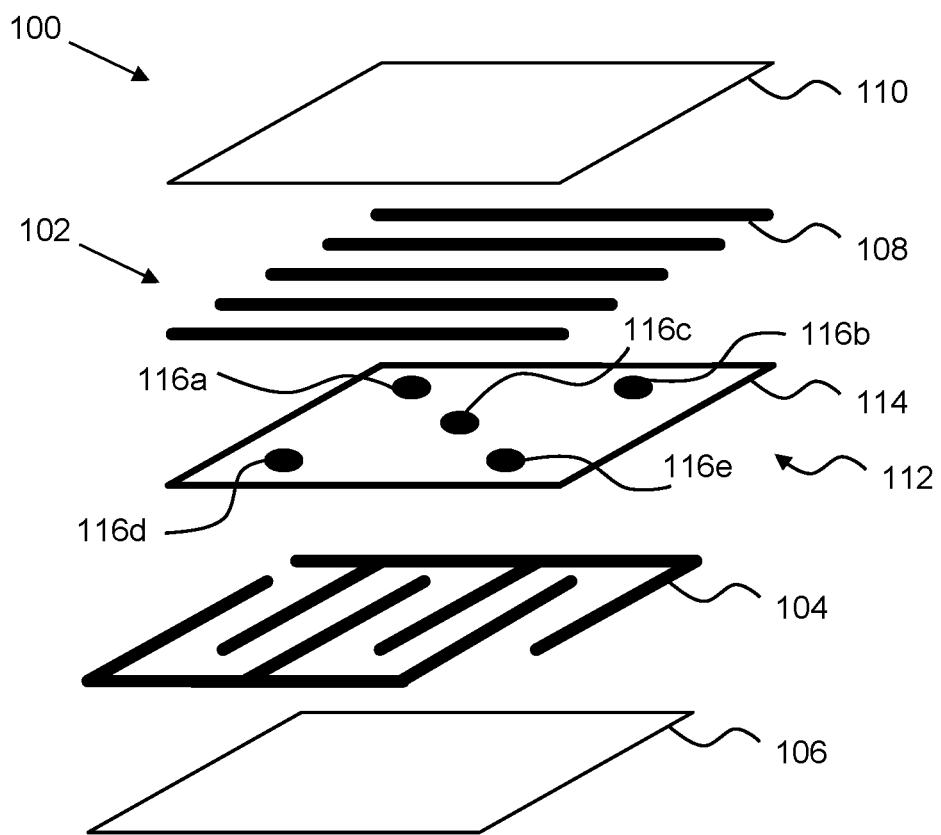
FIG. 1 shows an example of printed circuitry.

FIG. 1 shows an exploded view of printed circuitry 100 comprising a digitally printed switch 102. The printed switch 102 comprises a first contact element 104 which is digitally printed using conductive print agent on a first substrate portion 106, and a second contact element 108 which is digitally printed using conductive print agent on a second substrate portion 110. The substrate portions 106, 110 may be provided on the same or different substrates, which may be any type of substrate, for example comprising paper, card, plastic, or the like. The switch 102 further comprises an interposed digitally printed spacer element 112, which is overprinted on at least one of the first and the second substrate portions 106, 110. In this example, the black lines of the contact elements 104, 108 and the spacer element 112 indicate the presence of a print agent. For example, the surface area/spatial extent of the spacer element may at least partially overlie the surface area and/or spatial extent of the first and/or second contact element 104, 108

While the exploded view shows the elements 104-110 separately, in practice the elements 104-110 would be closely stacked.

In this example, the first contact element 104 comprises a broken conductive track which is formed of interleaved, but unconnected, conductive fingers. The second contact element 108 comprises a plurality of printed bars, and the arrangement is such that, when pressed together, the bars, which are arranged to be substantially orthogonal to the fingers, connects the fingers together. However, numerous alternative designs could be used to form the contact elements 104, 108.

The conductive print agent, which may for example comprise an ink comprising carbon particles such as carbon-nanotubes or graphene, or other conductive particles such as metallic particles, may be printed in one or more layers. In some examples, the number of layers is selected so as to provide a predetermined electrical characteristic such as conductivity. For example, 2, 3, 4, 5 or more layers may be provided and/or the cross section of the lines of the contact elements 104, 108 may be selected so as to provide a threshold conductivity.

The printed spacer element 112 may be printed using one or more layers any print agent such as liquid ink, paste, or power toner, which has a relatively high resistance. For example, this may comprise a cyan, yellow or magenta ink (which may comprise electronic ink comprising charged particles suspended in a carrier fluid) of a standard set of colorants.

In this example, the spacer element 112 comprises a border 114 and dispersed dots 116*a-e*. In practice, the design (including the height, which may be determined by the number of layers) of the spacer element 112 may vary. The design of the spacer element 112 may be so as to allow the first and second contact elements 104, 108, when urged together, to contact one another, but also such that the first and second contact elements 104, 108 are generally held apart. Thus, the design of the spacer element 112 may depend on features such as the rigidity of the substrate on which the contact element 104, 108 are printed, the achievable height of the printed elements, and the like.

In one example, a first spacer element 112 is printed so as to overlie the region of a substrate on which the first contact element 104 is provided and a second spacer element 112 is printed so as to overlie the region of a substrate on which the second contact element 108 is provided. In some examples, it may be more efficient to print to spacer elements 112 of a first number of layers than one spacer element of double the number of layers, which would provide the same spacing between the contact elements 104, 108.

In some examples, the first and second substrate portions 106, 110 may be part of a folded continuous substrate, or may have been printed on a single substrate, which was then cut. In other examples, the first and second substrate portions 106, 110 may be taken from different substrates, in some examples having been printed on different substrate sheets.

Such circuitry 100 may be efficiently printed. While in the past, combinations of non-printed and printed elements have been used form circuits, by printing all of the elements of the switch 102 including the nonconductive spacer element 112, the production process may be simplified.

In some examples, the printed circuitry 100 may be printed using 'liquid toners', which comprise toner particles suspended in a carrier fluid, for example using a liquid electrophotographic printer, or LEP. An LEP comprises a photoconductive surface which may be selectively charged such that liquid toner adheres thereto with an intended pattern. This pattern may be partially dried to form a print layer which is transferred to a substrate. In some such examples, a plurality of print layers may be transferred to a substrate in a single transfer operation. For example, a plurality of layers of print agent (which may comprise different print agent types, for example comprising one or more layers formed in conductive ink (for example forming the contact elements 104, 108) and one or more layers formed of an insulating ink (for example providing the spacer element 112) may be transferred to a substrate in a single operation.

As noted above, the switch is a digitally printed switch. Digital printing methods do not rely on printing plates, printing screens, or the like, and can deposit toners, inks and the like onto substrates in an adaptable manner. The printed image may be formed based on instructions derived from a data file describing the image, for example a digital representation of the image. For example, digital printing processes include inkjet printing (in which nozzles selective dispense drops print agents onto a substrate), laser, electrophotographic and/or xerographic printing (in which light is used to selectively discharge a charged surface such that charged toner particles are attracted thereto in a pattern, which may be formed on or transferred to a substrate), and the like. The switch 102 of FIG. 1 may be printed by any such printing apparatus.

In some examples, as set out in greater detail below, media content may be printed on a substrate bearing a contact element. In some examples, a contact element 104, 108 may be printed on a first side of a media sheet and media content may be printed on a second side of the media sheet.

Figure 2:
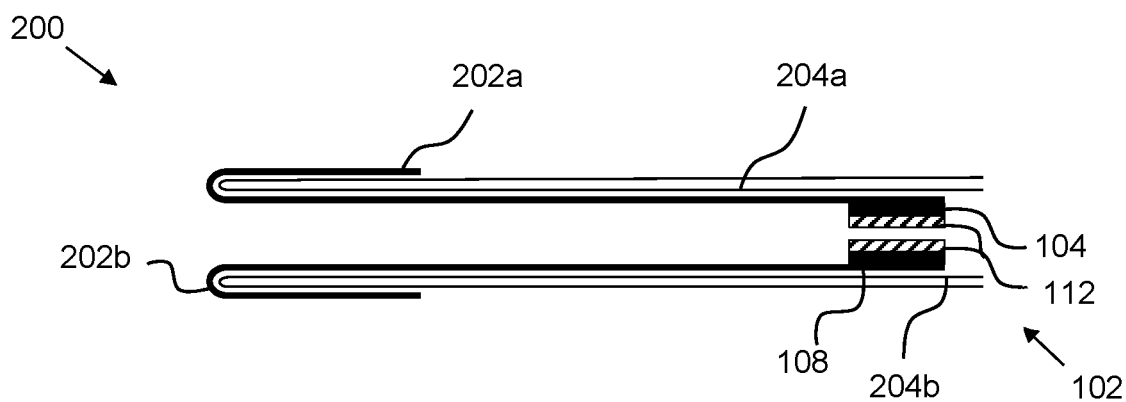
FIG. 2 shows another example of printed circuitry.

FIG. 2 shows another example of printed circuitry 200. The printed circuitry comprises a printed switch 102, which in some examples may comprise a digitally printed switch, and may be substantially as described above in relation to FIG. 1. In this example, there is a first conductive path 202*a* and second conductive path 202*b* connecting respectively to the first and second contact element 104, 108. The first and second conductive paths 202*a*, 202*b* extend over fold lines in respective first and second substrates 204*a*, 204*b*. This means that, when the first and second substrates 204*a*, 204*b* face one another with the contact elements 104, 108 facing one another, contact points to the first and second contact elements 104, 108 are readily accessible on the reverse of the first and second substrates 204*a*, 204*b*. In some examples, the first and second conductive paths 202*a*, 202*b* may be laterally offset, such that they are not aligned in the vertical direction of the Figure (and are therefore not in direct galvanic contact even when the substrates 204*a*, 204*b* are in face to face contact, although a galvanic connection may be formed via the switch 102). In this example, both contact elements 104, 108 are overprinted with a spacer element 112.

While in this example, one conductive path 202 is associated with each contact element 104, 108, this need not be the case in examples. In other examples, both of the conductive paths 202 may be associated with one of the first and the second contact element 104, 108. In the example shown, in which one conductive path 202 is associated with each of the first and the second contact elements 104, 108, then the conductive tracks may extend either side of the 'sandwich' of the substrates 204*a*, 204*b*.

In this example, the contact elements 104, 108 are thicker than the conductive paths 202, but this need not be the case in all examples.

In other examples, the first and second contact elements 104, 108 may be printed on the same side of the substrate, which may be folded to arrange the contact elements 104, 108 face to face. In such examples (or in examples in which the first and second contact elements 104, 108 are printed on different substrates), the edges of the substrate(s) may be misaligned so as to result in an overhang on one edge. In some such examples, at least one conductive track may extend into the region of the overhang such that it can be readily engaged without folding the substrate. In some examples, both conductive tracks may extend from one contact element 104, 108 into the region of the overhang.

Figure 3:
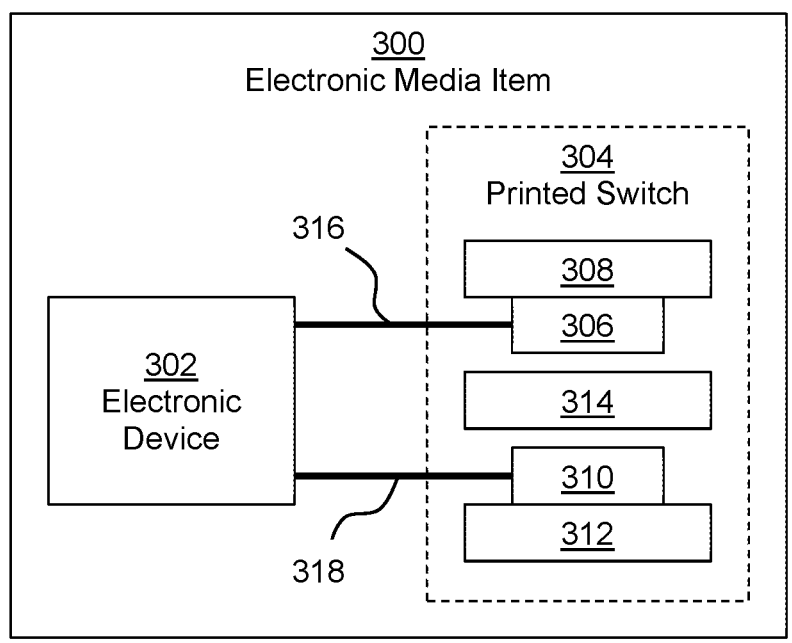
FIG. 3 shows an example of an electronic media item.

FIG. 3 shows a schematic side view of an example of an electronic media item 300. The electronic media item may comprise any physical item which is capable of providing delivering information such as media content to an end user, and may comprise part of a larger item. For example, the media item may a book, magazine, pamphlet, packaging, poster or the like. The electronic media item 300 comprises an electronic device 302 and a digitally printed switch 304 to actuate the first electronic device 302. The printed switch 304 comprises a first conductive contact element 306 digitally printed on a first media sheet portion 308, and a second conductive contact element 310 which is printed on a second media sheet portion 312. A digitally printed non-conductive printed spacer element 314 is interposed between the first and second contact elements 306, 310 and is overprinted on a media sheet portion on which at least one of the first and second contact elements 306, 310 is printed (i.e. on at least one of the first and second media sheet portions 308, 312).

A media sheet may for example comprise a discrete piece of a substrate such as a paper, card, plastic, glass, fabric or the like. Sheets may be defined before or after printing. For example, a 'web' or elongate stretch of a substrate may be printed and cut into sheets, or the sheets may be individually printed. The first media sheet portion 308 and the second media sheet portion 312 may be provided on the same or different media sheets. In some examples, a media sheet may be folded to form the electronic media item 300 and/or the electronic media item 300 may comprise a plurality of printed sheets.

The printed media item 300 further comprises a first conductive path 316 connecting the electronic device to the first contact element 306 and a second conductive path 318 connecting the electronic device 302 to the second contact element 310. In some examples, the conductive paths 316, 318 may be printed conductive paths (which may be digitally printed conductive paths), however, in this example, they comprise wires which connect to the electronic device 302. While in this example, the conductive path 316, 318 connect to different contact elements 306, 310, they could connect to the same contact element 306, 310. In addition, as is described in greater detail below, in some examples both contact elements may connect to two conductive paths 316, 318.

Media content (i.e. information which is directed towards a user, for example as images, words, patterns and the like) may be printed on at least one reverse side of the first and second media sheet portions 308, 312 to the contact elements 306, 310. In some examples, content may provide an indication of where the printed switch 304 lies. By printing media content on the reverse side, an interactive book, leaflet or the like may be produced in a simple manner, as separate fabrication of the content pages and the circuitry is not required, and instead these fabrication processes may be combined in a 'double sided' printing exercise. In some examples, the media content may be digitally printed media content.

FIGS. 4A to G show substrate sheets 400*a-g* which may combined to form an interactive book. Each substrate sheet 400 is printed with at least one digitally printed contact element 402, each of which has an overlying, digitally printed, spacer element 404. Some of the sheets 400*b-g* are also printed with conductive paths 406 which extend from the contact elements 402 towards a fold line 408*a-g*, and which terminate with widened regions 410 (labelled on FIG. 4B only) which extend across the fold line 408 of that sheet 400.

Figure 4B:
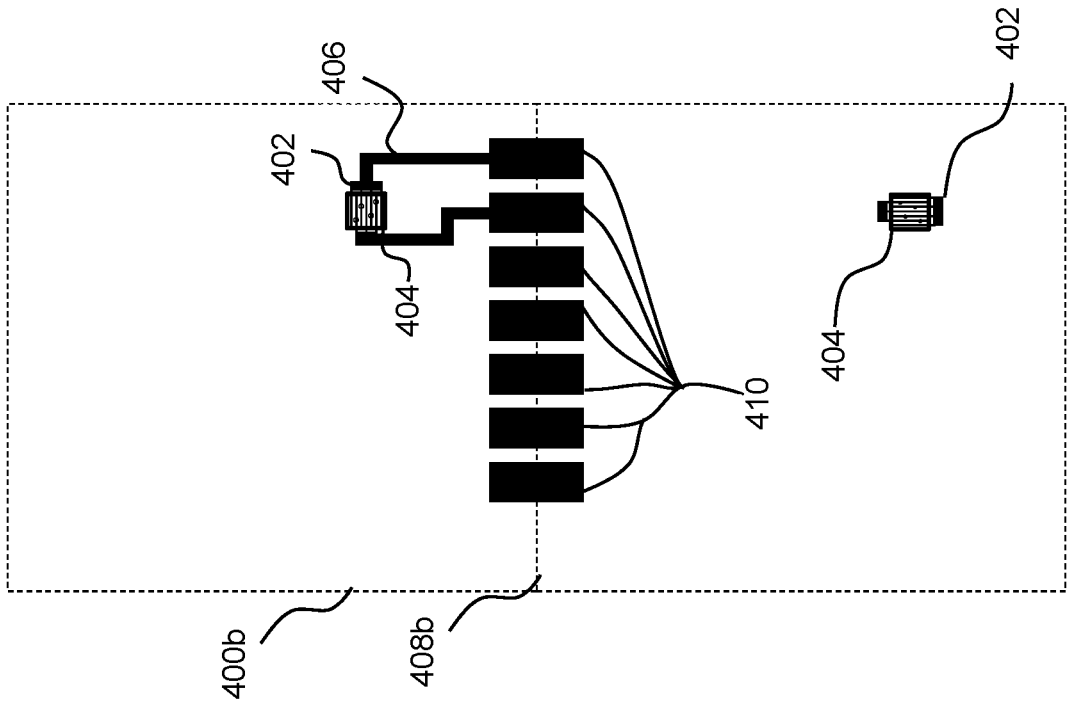
FIGS. 4A-G show printed sheets for use in forming an electronic media item.
Figure 4A:
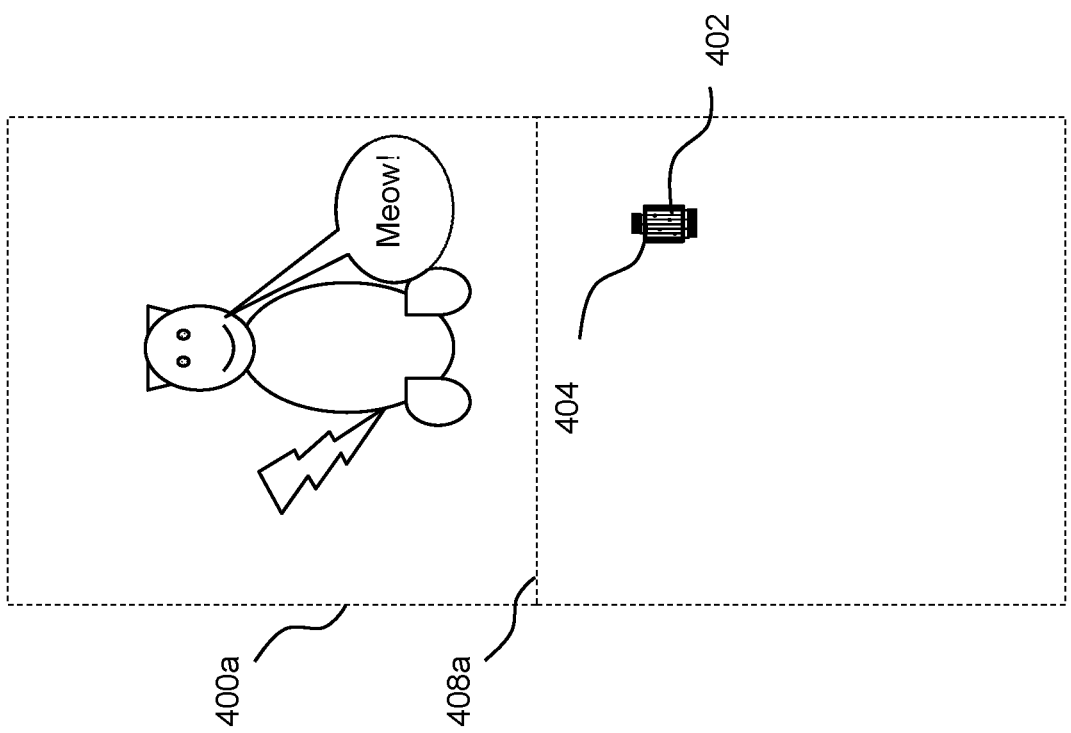
Figure 4D:
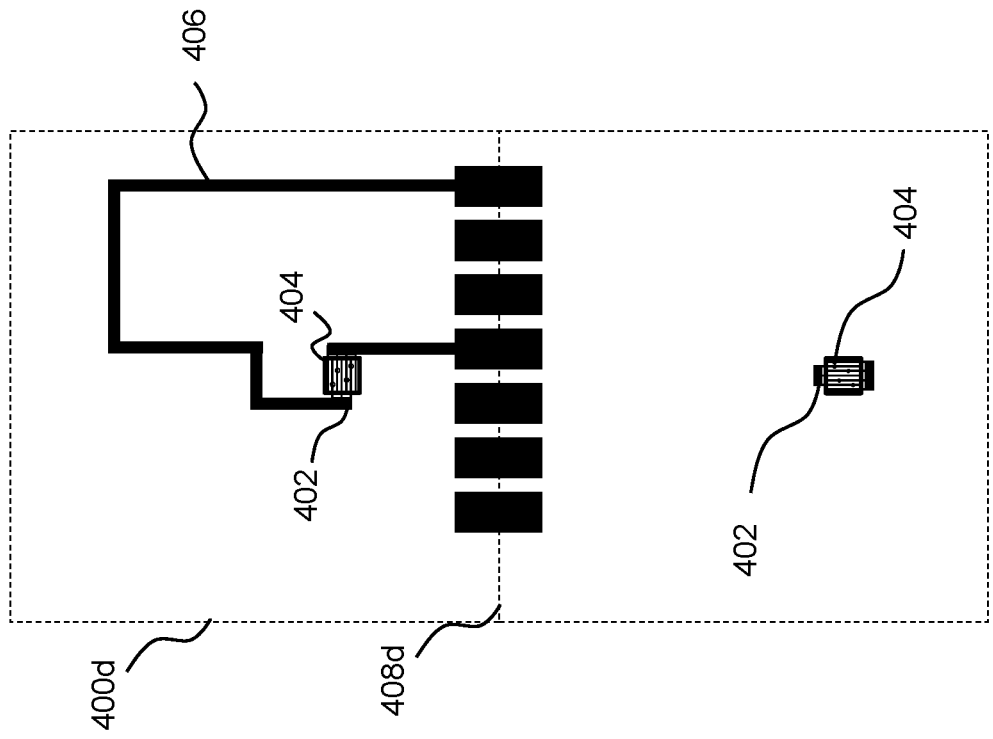
Figure 4C:
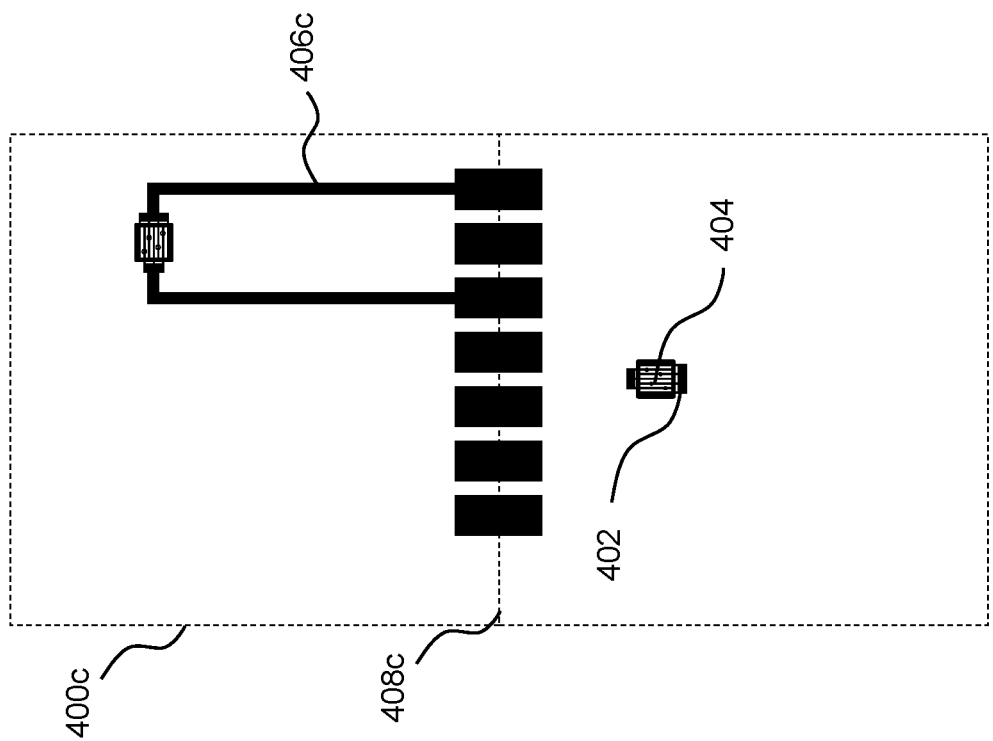
Figure 4F:
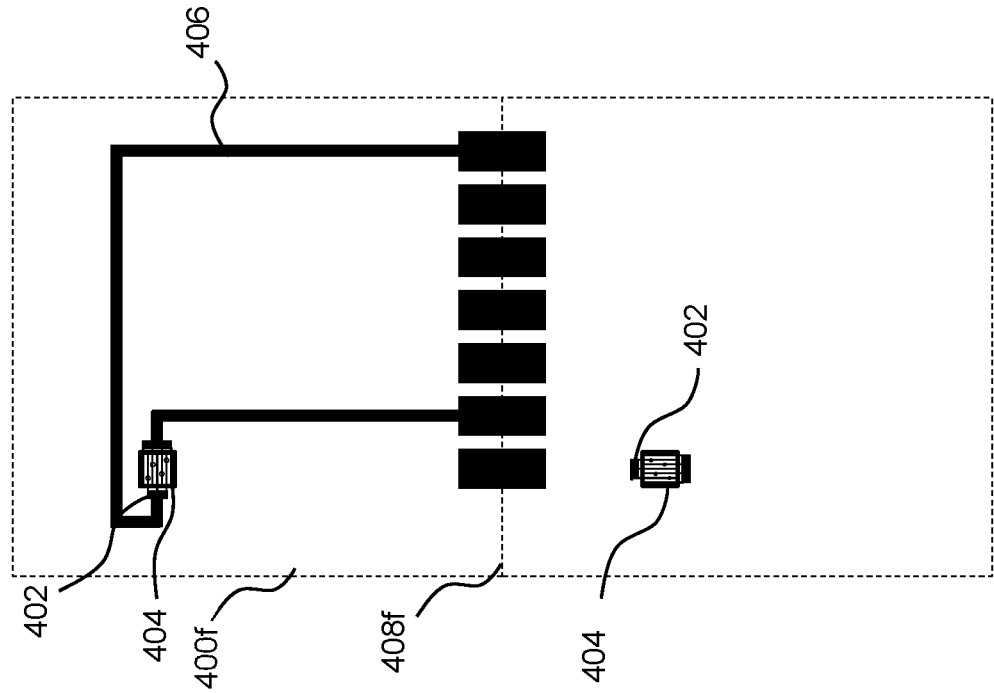
Figure 4E:
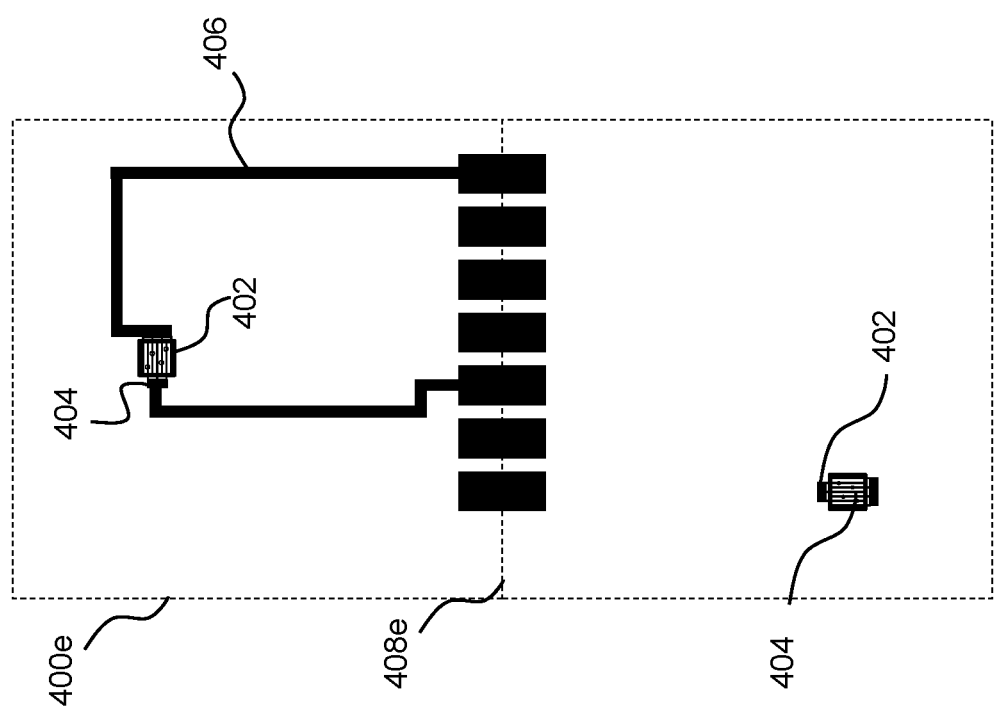

To assemble an interactive book, it is intended that each sheet 400 is to be folded along the fold line 408*a-g* with the contact elements 402 on the outside of the folded page, and the folded substrate sheets 400 may then be stacked on top of one another, such that the lower half of the sheet 400*a* shown in FIG. 4A contacts the upper half of the sheet 400*b* in FIG. 4B, the lower half of the sheet 400b shown in FIG. 4B contacts the upper half of the sheet 400c in FIG. 4C, and so on. The folded halves of adjacent sheets 400 which bear the contact elements 402 may be glued together, in some examples by applying adhesive such that it does not overlie the contact elements 402 (and, in some examples, the widened regions 410, although in other examples, the widened regions may be coated with conductive adhesive).

In this example, the upper half of the substrate sheet 400a in FIG. 4A shows printed content which is intended to indicate the location of an underlying printed switch (in this example, a speech bubble), and the folded sheet 400a may be glued shut. In general, however, such printed media content may be printed on the reverse side of each sheet 400, such that the sheets 400 may be opened along their fold lines 408 to reveal the content.

In this example, the printed conductive tracks 406 are substantially provided on the upper half of each substrate sheet 400b-g and each substrate sheet 400 comprises, in the region of the fold line 408, the widened region 410 which extends beyond the fold line 408, and which terminates the conductive tracks 406 on each page. When the sheets 400 are folded and a stack is formed, the widened regions 410 will align, allowing electrical signals to pass up and down via the 'spine' region of the assembled stack. More generally, once the stack is formed, a region of conductive track 406 (in this example, the widened region 410) spans the fold line 408 on one media sheet 400 and is to contact with a region of conductive print agent on another media sheet 400. While in this example all the widened regions 410 are provided on all sheets 400b-g, this need not be the case: the widened regions 410 serve as 'page to page' contact elements, each sheet 400 may bear those widened regions 410 to pass a signal from that sheet 400 and from any sheet 400 above it in the stack, and may not bear any widened region 410 for a signal which is intended to originate further down the stack.

As briefly noted above, in some examples, the widened regions 410 may be left clear of adhesive when forming a stack. However, in other examples, a conductive adhesive may be used in this region.

Some conductive print agents are relatively brittle and can crack or flake when flexed. Providing widened regions 410 which extend either side of the fold line 408 means that, even in the event that folding (and in some examples, opening and closing a book when formed) causing some cracking or flaking, it is likely that sufficient print agent will remain on the page to ensure a galvanic connection across the fold line 408.

Considering FIGS. 4A and 4B, when the pages are stacked, the contact element 402 on the sheet 400a shown in FIG. 4A will overly the contact element 402 on the sheet 400b shown in FIG. 4B. Pressing the region overlying the contact element 402 (which, if the sheet 400a of FIG. 4A is glued shut, comprises pressing the region of the speech bubble) may cause the switch formed by those two contact elements 402 to close, overcoming the air gap provided by the spacer element, and a signal may be generated at the widened region 410 shown in FIG. 4B which is second from the right (assuming a power supply is connected to the right-most widened region). Each successive page has another actuatable switch, generating signals at successive widened regions 410.

While in this example, there is provided one switch per sheet 400, there may be a plurality of switches on a page, and/or at least one page may have no switch.

Figure 4G:
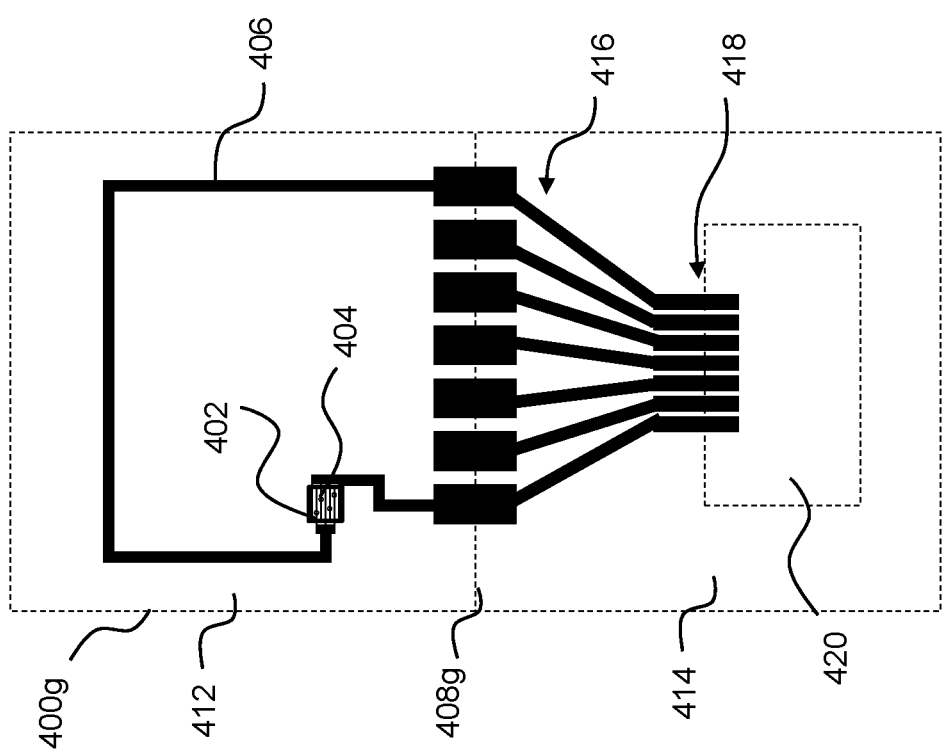

As can be seen in FIG. 4G, the final sheet 400 comprises an upper half 412 bearing a contact element 402 which is overprinted with a spacer element 404, the upper half 412 also bearing tracks 406 and widened regions 410, which extend over the fold line 408g into a lower half 414. The lower half 414 also comprises printed tracks 416 leading from each widened region 410 to contact points 418. When the sheets 400 are stacked, at least one electronic device may be provided in the marked region 420. In one example, each contact point 418 may be associated with a different electronic device, such as a screen, a light source, a speaker, etc. In some examples, a power supply, for example a battery, may also be provided and actuating a switch by pressing on a region of a substrate overlying a contact element may connect the power supply to the device.

As noted above, the conductive features may be printed with either one layer or several layers one on top of the other to provide a higher conductivity. The spacer element 404 may be printed with one or several layers to create an intended spacing.

In another example, the electronic device may comprise a controller, for example a microcontroller. The controller may for example comprise multiple inputs (for example, multiple input pins), which may result in the controller controlling a separate electronic device to carry out particular actions. For example, as a result of a signal at a first contact point, a speaker may be controlled to play a first sound and as a result of a signal at a second contact point, a speaker may be controlled to play a second sound. The sounds (or other responses to signals) may be encoded and held in a memory.

The sheets 400 may be paper, which may be a relatively heavy paper (for example, 300-350 microns thick) or card. In other examples, the sheets 400 may comprise a plastic, fabric, or some other material. In some examples, different sheets 400 may comprise different substrate types. The sheets 400 may be formed (e.g. cut from a larger sheet or web) before or after printing.

Figure 5:
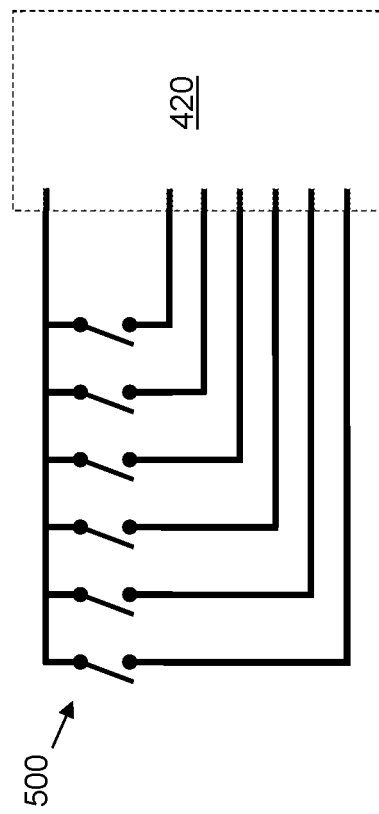
FIG. 5 is a circuit representing the circuit formed by the sheets of FIG. 4A-G.

FIG. 5 shows an equivalent circuit 500 to the assembled stack shown in FIGS. 4A-G, with each pair of contact elements illustrated as a switch.

Figure 6D:
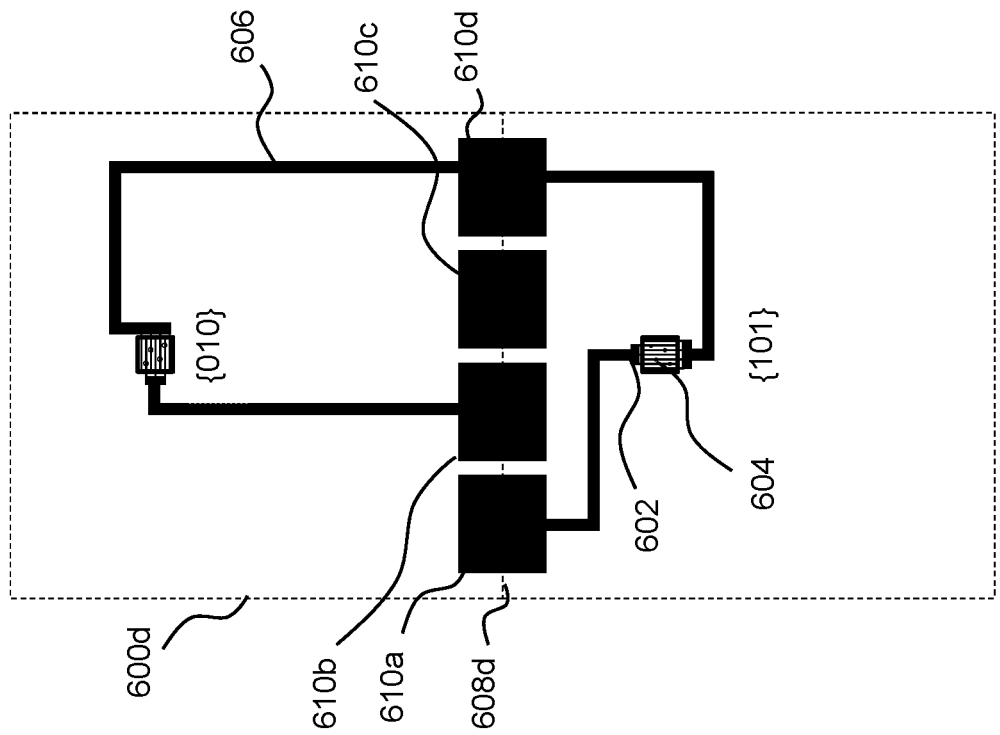

FIGS. 6A-G show another example, in which each switch can actuate two contact points. Each of FIGS. 6B to 6F show a substrate sheet 600b-f printed on one side with conductive print agent providing contact elements 602 overprinted with spacer elements 604 on both the upper and lower halves thereof, whereas FIGS. 6A and 6G show sheets 600a, 600g printed contact elements 602 overprinted with spacer elements 604 on one of the lower and upper halves respectively. As described in relation to FIG. 4, the sheets 600a-g are intended to be folded along a fold line 608a-g with the contact elements 602 on the outside of the folded sheets 600, and the folded substrate sheets 600 are intended to be stacked on top of one another, such that the lower half of the substrate shown in FIG. 6A contacts the upper half of the substrate in FIG. 6B, the lower half of the substrate sheet 600b shown in FIG. 6B contacts the upper half of the substrate in FIG. 6C, and so on. The fold lines 608 may be aligned in forming the stack. The sides of adjacent substrates which bear contact elements 602 may then be glued together, in some examples by applying adhesive such that it does not overlie the contact elements 602 and the widened regions 610 (although in other examples, conductive adhesive may be used over the widened regions).

Figure 6C:
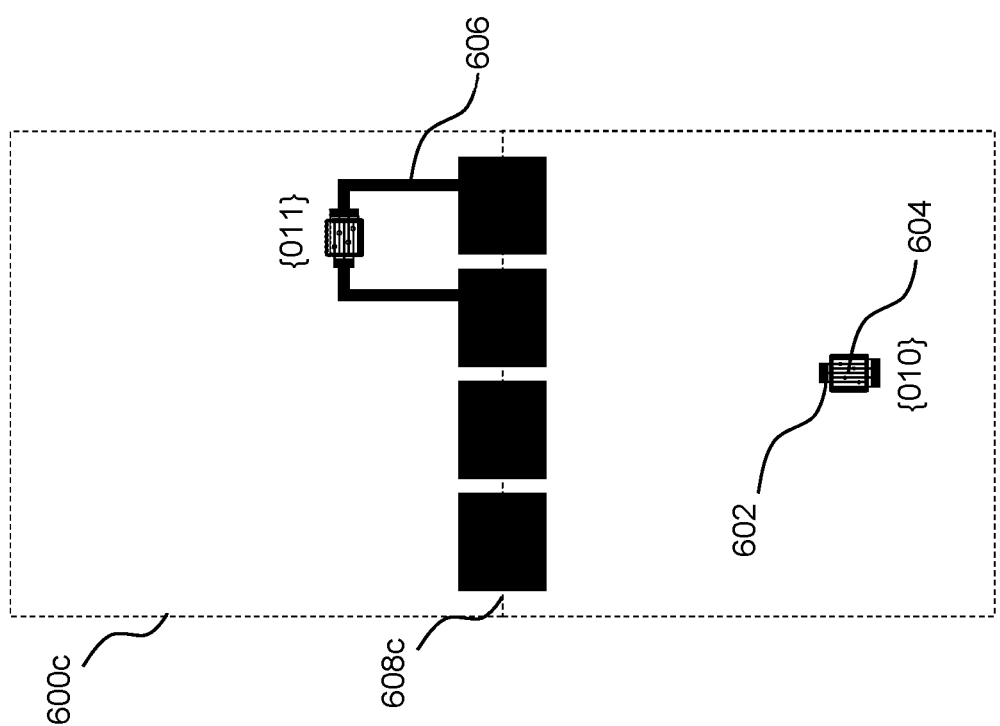
Figure 6F:
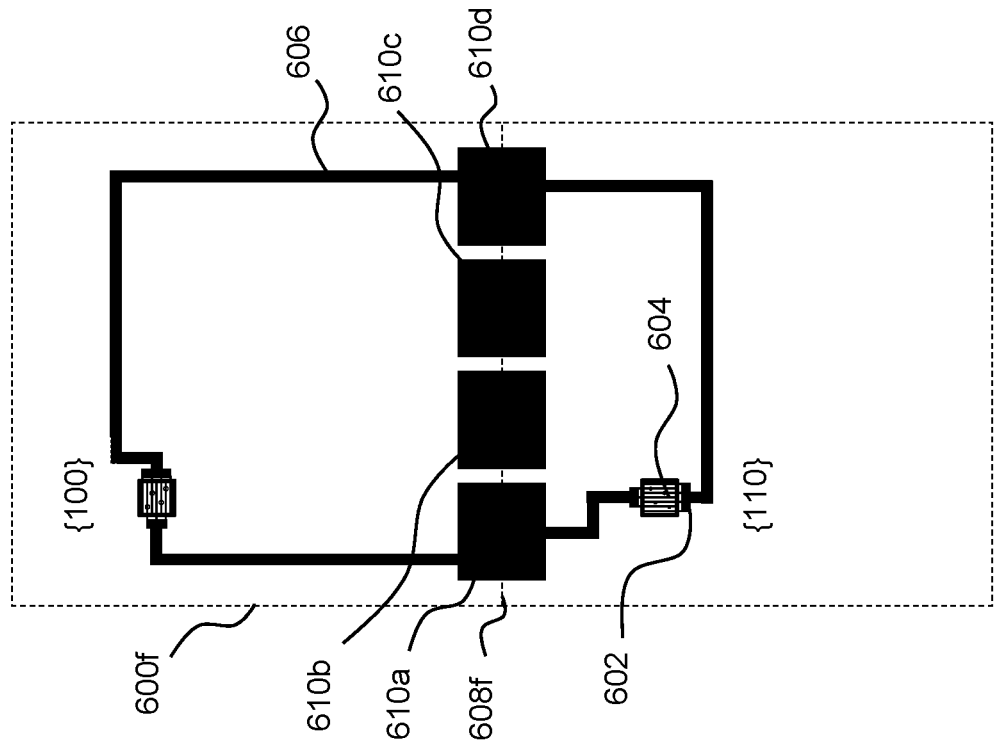
Figure 6E:
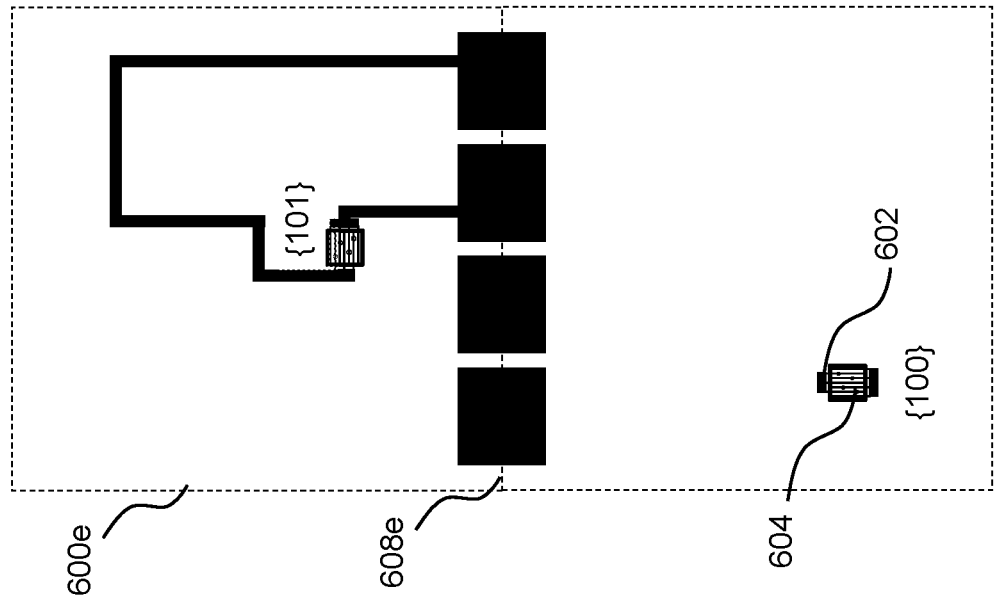

In this example, and in contrast with FIGS. 4A-4G, on the sheets 600b, d, f and FIGS. 6B, 6D and 6F, the contact elements 602 on each half of each sheet has conductive tracks 606 associated therewith, whereas in FIGS. 6C and 6E, the top half of the substrate sheets 600c, e are provided with conductive tracks 606 and the bottom half of the substrate sheets 600c, e do not have such tracks.

In this example, there are four widened regions 610a-d on each sheet 600, providing a connection to four contact points 612a-d on the last substrate sheet 600g. One of the contact points 612d provides a common connection and each of the other contact points may be activated or not, leading to a 3 bit coded signal. In this example, the electronic component comprises a controller 614 which is capable of controlling one or more additional electronic devices, in this example a speaker 616, as shown on FIG. 6G. In some examples a power source such as a battery may be provided.

Considering two sheets 600b and 600c, these may be stacked such that the bottom half of sheet 600b faces the upper half of sheet 600c. Thus, the contact point 602 on the lower half of sheet 600b will overlie the contact point 602 of the upper half of sheet 600c. Applying pressure to this region of the stacked sheets 600 will cause a signal to be generated at the second contact point 612b from the left from the signal generated by the circuit of the lower half of sheet 600b in FIG. 6B and will also cause a signal to be generated at the third contact point 612c from the left from the signal generated by the circuit of the upper half of sheet 600c in FIG. 6C. Such a signal may therefore be encoded as 011, as indicated on the Figures (while this information may be a printed feature of the sheets, this need not be the case in all examples)

Therefore, in this example, a total of six different signals, noted in the Figures adjacent to the relevant contact elements 604 (but may not be printed on the sheets in all examples) may be provided by four contact points 612, and four widened regions 610 (bearing in mind that the 000 signal is not used as this is the 'unactivated' state and in this example the 111 signal is not accessible). This in turn means that the widened regions 610 may each occupy a larger proportion of the fold line and/or more signals may be provided without reducing the size of the widened regions 610 unduly. Given the tendency for some conductive agents to crack or flake in the region of a fold line 608, this may assist in maintaining the integrity of the galvanic connection across the fold line.

FIG. 7 shows an equivalent circuit 700 to the assembled stack shown in FIGS. 6A-G.

It may therefore be seen that, in the example of FIGS. 6A-G and 7, for an electronic printed media item, there is, for at least some of the printed switches, a first conductive path connecting the electronic device to a first contact element and a second conductive path connecting the electronic device to the second contact element of the switch, as well as a third conductive path connecting the first contact element to a first input of the electronic device to the first contact element and a fourth conductive path connecting the second contact element to a second input of the electronic device. However, others of the printed switches connect to exactly one of the inputs (in such examples, exactly one of the bits is set to 1). The when the first and second contact elements are pressed together, two completed circuits may be formed: a first circuit comprising the electronic device (which may include a power source, such as a battery), the contact elements and the first and third conductive paths, and a second circuit comprising the electronic device, the contact elements and the second and fourth conductive paths. In other words, in some examples, as a result of pressing two contact elements together, two inputs may be provided to an electronic device.

Figure 8:
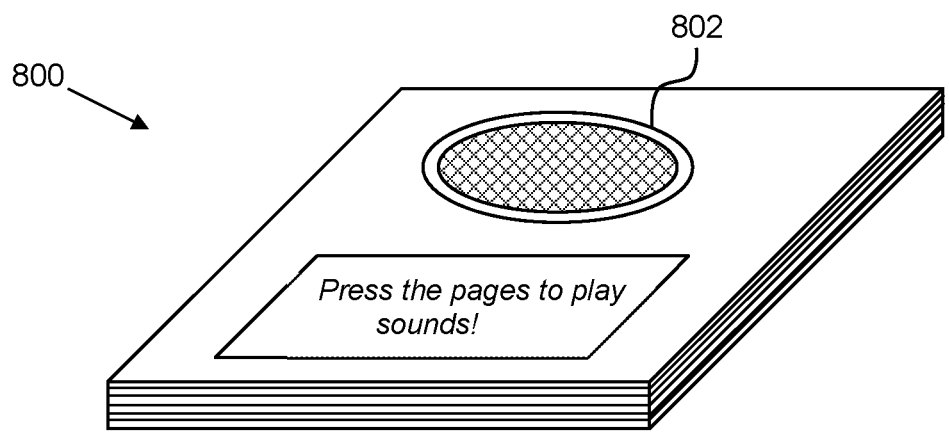
FIG. 8 shows an example of an interactive book.

FIG. 8 shows an example of electronic printed media item, in this example comprising an interactive book 800 comprising a speaker 802, which in this example extends through a cut-out in the pages. The pages of the book 800 may be formed as set out in FIG. 4A-G or 6A-G.

Figure 9:
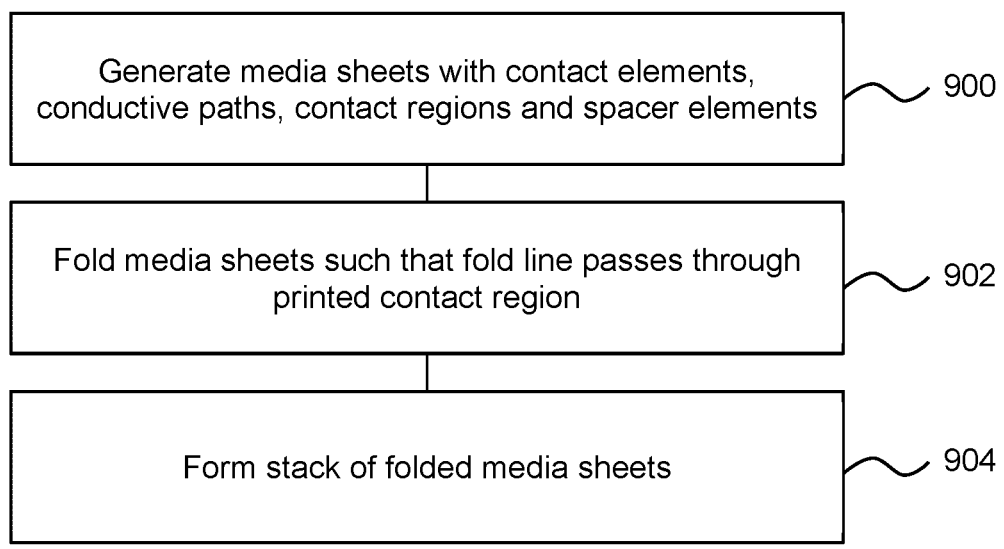
FIG. 9 shows an example of a method of forming an electronic media item.

FIG. 9 is an example of a method, which may be a method of printing pages for an electronic printed media item. Block 900 comprises generating a plurality of media sheets by (i) printing a plurality of contact elements, conductive paths and contact regions in conductive print agent, such that the conductive paths galvanically connect at least one contact element to a printed contact region, and (ii) overprinting at least one contact element with a spacer element using non-conducting print agent. The plurality of media sheets may be formed before or after printing. For example, a single media sheet or web may be printed and cut to form the plurality of sheets of block 900. The printing may comprise digital printing.

For example, this block may result in a printed sheet 400, 600 as shown in FIG. 4A-G or 6A-G.

The printing may be carried out so as to apply a plurality of print agent layers for one or both of the conductive and the non-conductive printed features.

Block 902 comprises folding the media sheets such that the fold line passes through the printed contact region. In some examples, the printed contact region may comprise a widened region 610, 810 as described above.

Block 904 comprises forming a stack of folded media sheets such that a portion of the contact region on a first side of a fold line on a first media sheet contacts a contact region on a second media sheet and, in some examples, a contact region on a second side of a fold line on the first media sheet contacts a contact region on a third media sheet, and a contact element of the first sheet faces a contact element of the second sheet. In some examples, sides with facing contact elements may be glued together. In some examples, the glue or adhesive may be applied so as to leave the contact elements uncovered thereby. The fold lines may be aligned.

In some examples, the contact elements printed in block 900 are printed on respective first faces of the media sheets and the method may further comprise printing media content on a second side of at least one media sheet. In some examples, the media content may be indicative of where the electronic switches are located. In some examples, the contact elements, conductive paths and spacer elements printed in block 900 are printed to a substrate in a single operation. For example, the layer may be built up on an intermediate transfer member of an offset printer such as an LEP and applied to the substrate as an assembled stack.

In some examples, the method may further comprise connecting at least one contact region to an electronic apparatus. The electronic apparatus may for example comprise at least one of a controller, a speaker, a light source, a display screen, processing circuitry, power supply and a memory. The connection may be via an additional printed conductive path and/or via the contact regions of a plurality of printed sheets.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. Printed circuitry comprising a digitally printed switch, the digitally printed switch comprising:
    a first contact element digitally printed using one or more layers of a conductive print agent on a first media sheet portion;
    a second contact element digitally printed using one or more layers of a conductive print agent on a second media sheet portion and at a position to be vertically aligned under the first contact element; and
    an interposed non-conductive printed spacer element overprinted on the first media sheet portion using one or more layers of a non-conducting print agent,
    wherein the interposed non-conductive printed spacer element is configured so as to separate the first and second contact elements when the first and second elements are not urged together and so as to allow the first and second contact elements to contact one another when the first and second elements are urged together, and
    wherein the conductive print agent forming the first contact element and the non-conducting print agent forming the interposed non-conductive printed spacer element are configured such that the one or more layers of the conductive print agent and the one or more layers of non-conducting print agent may be transferred to the first media sheet portion in a single transfer operation.

2. Printed circuitry according to claim 1 further comprising a first printed conductive path connecting to the first contact element and a second printed conductive path connecting to at least one of the first and second contact element.

3. Printed circuitry according to claim 1 wherein the interposed non-conductive printed spacer element comprises a border of the non-conducting print agent overprinted on the first media sheet portion.

4. Printed circuitry according to claim 3 wherein the interposed non-conductive printed spacer element further comprises a plurality of dots within the border.

5. Printed circuitry according to claim 1 wherein the conductive print agent and the non-conducting print agent include liquid toners.

6. Printed circuitry according to claim 5 wherein the one or more layers of the conductive print agent and the one or more layers of non-conducting print agent are transferred to the first media sheet portion using a liquid electrophotographic printer.

7. Printed circuitry according to claim 5 wherein the first media sheet portion is included on a side of card having media content printed on the reverse side thereof.

8. Printed circuitry according to claim 7 wherein the one or more layers of the conductive print agent and the one or more layers of non-conducting print agent are transferred to the first media sheet portion in a single transfer operation and media content printed on the reverse side thereof according to a double sided printing process.

9. An electronic printed media item comprising:
    a first electronic device and a first printed switch to actuate the first electronic device,
    the first printed switch comprising:
        a first digitally printed conductive contact element printed on a first media sheet portion;
        a second digitally printed conductive contact element printed on a second media sheet portion; and
        a digitally printed spacer element interposed between the first and second conductive contact elements and overprinted on a media sheet portion on which at least one of the first and second conductive contact elements is printed,
    the electronic printed media item further comprising a first conductive path connecting the first electronic device to the first conductive contact element and a second conductive path connecting the first electronic device to one of the first and second conductive contact elements,
    wherein at least one of the first and second conductive paths is a printed conductive track spanning a fold line on a first media sheet on which a corresponding one of the first and second conductive contact elements is printed, a region of the at least one of the first and second conductive paths to contact a region of printed conductive print agent on a second media sheet.

10. An electronic printed media item according to claim 9 wherein at least one of the first and second conductive contact elements is printed on a first side of the media sheet and media content is printed on a second side of the media sheet.

11. An electronic printed media item according to claim 9 wherein the at least one of the first and second conductive paths comprises a widened region which spans the fold line.

12. An electronic printed media item according to claim 9 further comprising a third conductive path connecting the first conductive contact element to a first input of the first electronic device to the first conductive contact element and a fourth conductive path connecting the second conductive contact element to a second input of the first electronic device.

13. An electronic printed media item according to claim 9 wherein the first media sheet portion and the second media sheet portion are fixed to one another with the first and second conductive contact elements facing each other.

14. An electronic printed media item according to claim 9 further comprising a second printed switch to actuate the first electronic device, the second printed switch comprising:
    a third conductive contact element printed on the second media sheet comprising the second media sheet portion;
    a fourth conductive contact element printed on a third media sheet portion; and
    a printed spacer element interposed between the third and fourth conductive contact elements and overprinted on a media sheet portion on which at least one of the third and fourth conductive contact elements is printed.

15. An electronic printed media item according to claim 9 in which the first electronic device comprises a controller, and the electronic printed media item comprises a second electronic device which is controlled by the controller.

16. An electronic printed media item according to claim 9 wherein the first and second media sheet portions comprise paper or card.

17. A method comprising:
    generating a plurality of media sheets by printing a plurality of contact elements, conductive paths and contact regions in conductive print agent, such that the conductive paths galvanically connecting a least one contact element to a printed contact region, and overprinting at least one contact element with a spacer element using non-conducting print agent;

folding the media sheets such that a fold line passes through the printed contact region; and forming a stack of folded media sheets such that a portion of the printed contact region on a first side of a fold line on a first media sheet contacts a contact region on a second media sheet and a portion of the contact region on a second side of a fold line on the first media sheet contacts a contact region on a third media sheet, and a contact element of the first media sheet faces a contact element of the second media sheet.

18. A method according to claim 17 wherein the contact elements are printed on respective first sides of the media sheets, and printing the plurality of media sheets comprises printing media content on a second side of at least one media sheet.

19. A method according to claim 17 further comprising connecting at least one contact region to electronic apparatus comprising at least one of a controller, a speaker, a light source, a display screen, processing circuitry, a power supply and a memory.

* * * * *